J. S. BIRCH.

Self-Adjusting Watch Key.

No. 9,310. Reissued July 20, 1880.

Witnesses:

Charles R. Searle.

O. J. Morgan

John S. Birch

Inventor:

By A. P. Thayer

Attorney.

UNITED STATES PATENT OFFICE.

JOHN S. BIRCH, OF ORANGE, NEW JERSEY.

SELF-ADJUSTING WATCH-KEY.

SPECIFICATION forming part of Reissued Letters Patent No. 9,310, dated July 20, 1880.

Original No. 88,836, dated April 13, 1869. Application for reissue filed June 14, 1880.

*To all whom it may concern:*

Be it known that I, JOHN S. BIRCH, of Orange, in the county of Essex and State of New Jersey, have invented a new and useful Improvement in an Adjustable Holding Device and Watch-Key, of which the following is a specification.

My invention relates to a watch-key or instrument for holding small objects, in which a pair of adjustable jaws for holding objects of different sizes are made to receive the post of a watch or other object to be held endwise or lengthwise between them, and hold it by griping the sides.

This improved instrument consists, essentially, of a pair of griping-jaws fixed with the ends slightly protruding from the end of a tube, in which they slide longitudinally, and are made to open and close thereby for griping and holding the object or releasing the same.

My invention consists of the combination, with said jaws and case, of a push-piece by which to move the jaws in one direction—say for opening—and a spring for moving them the other way—say for the closing of the jaws and holding the object; and, furthermore, it consists of a stop device, in combination with the other parts of the instrument, to prevent the jaws from turning in the case by torsional strain when the instrument is used for winding a watch, the parts being constructed and arranged so that the operator may conveniently hold and work a light instrument for holding small objects, or winding a watch with one hand by working the push-piece with one finger while holding the instrument with the thumb and other fingers of the same hand.

Figure 1:
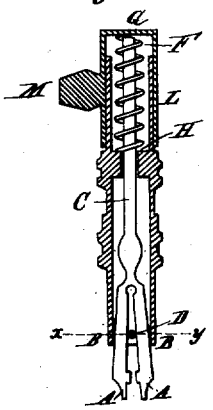
Figure 2:
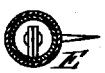
Figure 3:
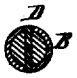
Figure 4:
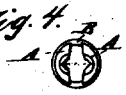

Figure 1 is a longitudinal section of my improved instrument. Figs. 2 and 3 are cross-sections of the same. Fig. 4 is an end view of the jaws.

A represents the points of a pair of griping-jaws, B, of steel or other approved metal, the faces of which jaws are shaped, longitudinally, suitably for the reception of the post of a watch, small wire, or other like object, or object of like form, endwise between them, to gripe and hold the same, for the winding of a watch, or holding of the wire or other object for any purpose.

The jaws, which will be of any length suited to the object which the instrument is to hold, connect with a stock, C, which, together with said jaws, is fitted within a case or tube, E, by which the parts are controlled and the instrument is to be held in use, and from one end of which the jaws project. The jaws, which open when thrust forward of the end of the case, are made to close and gripe the object to be held, when they are shifted backward along said end by the coiled spring F within said case, and so connected with the stock by cap or push-piece G, and contracted between it and the shoulder H, as to urge the jaws along the tube or case with such pressure as to wedge the jaws therein and cause them to press upon the object between them with more or less force, according to the power of the spring, which may be graduated to suit the use for which the instrument is to be employed. For a guide to the push-piece G the tube L is attached to it, and arranged to slide on the upper part of case E. It may slide within said case, if preferred, or shoulders H may serve instead.

For winding a watch, or for any other use causing torsional strain too great for the friction of the jaws against the end of the case, the pin D is employed, said pin projecting from the case between the jaws, so as to prevent them from turning in the case. Said pin may project either from one or two sides of the case into the space between the jaws or through it, as may be preferred.

The jaws B are so connected with the stock C that they spring open; but they may be hinged to it and have other means of opening them, if preferred. The spring contrivance is believed, however, to be the best.

M represents a screw-driver attachment, which I have applied to the instrument for convenience.

Having thus described my invention, what I claim, and desire to secure by Letters Patent, is—

1. The combination, with the tubular case E, of griping-jaw A B and a stock, C, thereto within said tube, and capable of longitudinal and opening and closing movements; also, a push-piece, G, and a spring, F, connected with said stock, for effecting said longitudinal and opening and closing movements, all constructed and arranged whereby the instrument may be held and operated as described.

2. The combination, with the tubular case E, of griping-jaws A B and a stock, C, thereto within said tube, and capable of longitudinal and opening and closing movements, a push-piece, G, and a spring F, connected with said stock for effecting said longitudinal and opening and closing movements, and a stop device, D, to prevent the jaws from turning in the case, all constructed and arranged whereby the instrument may be held and operated as described.

JOHN S. BIRCH.

Witnesses:
A. P. THAYER,
W. J. MORGAN.